July 11, 1939.  G. W. DOUGLAS ET AL  2,165,239
ROTATING AND ADJUSTABLE POPPET VALVE
Filed Dec. 9, 1936
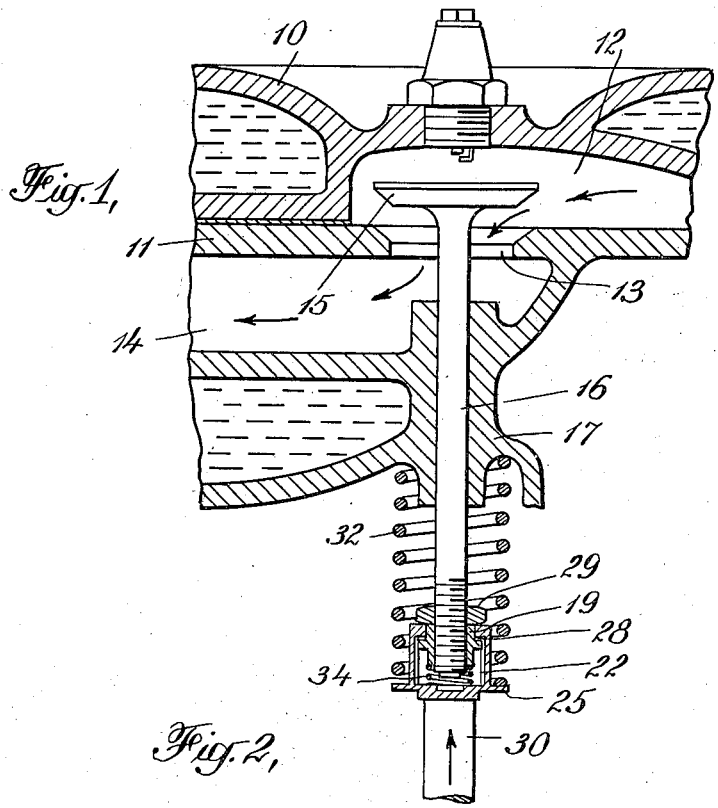
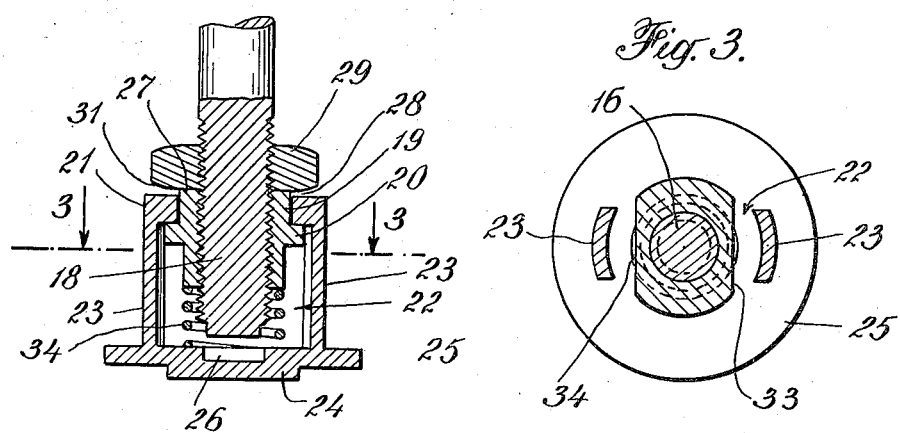
INVENTOR
George W. Douglas
John Joseph Dewey
BY
ATTORNEYS Patented July 11, 1939

2,165,239

UNITED STATES PATENT OFFICE 2,165,239

ROTATING AND ADJUSTABLE POPPET VALVE

George Warren Douglas, New York, N. Y., and John Joseph Dewey, Greenwich, Conn.

Application December 9, 1936, Serial No. 114,946

11 Claims. (Cl. 123—90)

This invention relates to rotating and adjustable poppet valves for internal combustion engines, such as automotive, aeronautical and marine engines.

The poppet valves used in internal combustion engines, especially the exhaust valves, are subject to extreme temperature conditions which tend toward the deterioration of the valve and improper operation thereof. The deterioration takes the form of warping due to concentration of heat at one point, and this, together with uneven and accumulating carbon deposits, pitting, and unevenness of wear, result in leakage of the valve and loss of compression, as well as sticking of the valve.

As is described in our prior Patent 2,019,255, and our copending application Serial No. 70,122, filed March 21, 1936, it is desirable to rotate the valve to the end that the same area of the valve is not continuously presented to the hot gases and thus be subject to warping, and, as carbon deposits form, it is desirable that they be wiped off by rotation of the valve. This rotation of the valve takes place between relatively rotatable, but unitarily reciprocating parts of the valve assembly and is effected during reciprocation movement thereof, caused in one direction by the tappet engaging the valve stem and in the other direction by a coil spring.

As in the arrangements of the aforementioned patent and application, this rotation of the valve in the present invention is effected by the inherent twist of the valve spring. The valve is released from the tension of the spring during the opening movement thereof, and the assembly is so constructed that the inherent twist of the spring is not transmitted to the valve, but rather is expended in a relative movement between two parts of the valve assembly, one portion of which carries the valve and is loosely connected to the other portion, which is engaged by the valve spring. Upon the return stroke or closing movement of the valve the spring is released and causes positive frictional engagement between the loosely connected portions of the valve assembly, so that the inherent rotation of the spring is imparted to the valve during its closing operation. Thus, during each reciprocation of the valve, it is rotated through a small angle, resulting in a progressive, step-by-step rotation.

In the arrangement of the present invention, the spring-engaged portion of the valve assembly is in the form of a cage adjustable longitudinally of the valve stem to compensate for wear and to vary the relationship between the tappet and the valve for adjusting the operation of the engine, the valve stem being the other portion of the valve assembly. The lower portion of the valve stem is threaded and carries an adjustable sleeve which loosely and rotatably supports the cage and affords a lost motion for the cage longitudinally of the valve stem, which is sufficient to relieve the valve stem of the spring pressure during the valve opening operation as the cage is engaged by the tappet. During the valve-opening operation, the cage, in response to the inherent twist of the spring, rotates relatively to the valve stem, so that the valve does not rotate, whereas on the valve-closing stroke, the released spring forces the cage into firm frictional contact with the valve stem sleeve, so that they are frictionally bound together to an extent which causes the return twist of the spring to be imparted by the cage to the valve stem, effecting rotation of the valve. Also, with this arrangement, the cage may be not only adjusted longitudinally of the stem to change the length of the stem, but it may be readily removed so that the valve may be withdrawn if desired from the head of the engine and whenever worn, the cage may be readily replaced without requiring replacement of the valve, as is the case where the tappet bears directly against the end of the valve stem.

For a more complete understanding of the invention reference may be had to the accompanying drawing, in which:

Figure 1 is a typical section through an automobile engine illustrating a poppet valve fitted with the rotating and adjustable arrangement of this invention;

Fig. 2 is an enlarged axial section of the cage and its appurtenant parts; and

Fig. 3 is a transverse section therethrough, as seen along the line 3—3 of Fig. 2.

Referring to Fig. 1 of the drawing, which illustrates the usual internal combustion engine construction, the cylinder head 10 cooperates with the engine block 11 to form a combustion space 12 having an exhaust port 13 leading to the exhaust passage 14 and normally closed by exhaust valve 15 carried by the valve stem 16 slidably mounted in the valve stem guide 17. It will be understood that this description applies equally well to intake valves and is used merely for the purpose of illustration.

The lower end 18 of the valve stem 16 is threaded and adjustable therealong is a sleeve 19 having a flange 20 normally engaged by the overlapping abutment 21 of the cage 22, which has depending legs 23 supporting the base 24 having a lateral flange 25 and a recess 26 into which the end of the valve stem 16 may extend where the adjustment of the length of the valve requires it.

The axial thickness of the abutment 21 of the cage 22 is less than the axial length of the upper extension 27 of the sleeve 19, so that a space 28 is formed between the upper surface of the abutment 21 of cage 22 and the lower surface of the nut 29, which serves as a lock nut for sleeve 19, and also defines the upper limit of movement of the cage 22 when it is engaged and lifted by the tappet 30. The space 28 is shown exaggerated in Figs. 1 and 2 and normally need be only a few hundredths of an inch, sufficient to enable the frictional release of the abutment 21 of cage 22 from the flange 20 of sleeve 19.

The radial fit between extension 27 and abutment 21 is relatively loose to permit free rotation between cage 22 and sleeve 19 when the cage is lifted from flange 20 by tappet 30. Likewise, the friction between the lower surface of nut 29 and the upper surface of abutment 21, that is, the surfaces defining the space 28 is relatively low and to that end the nut 29 is chamfered as at 31.

The conventional coil tension spring 32 extends between the lower end of valve stem guide 17 and the flange 25 on cage 22, and, because the spring is stiff, there is a considerable friction between its opposite ends and the surfaces they engage, such that the inherent twist of the spring in its compression and extension movements is imparted to the cage 22, resulting in an oscillating movement thereof.

In operation, where it is desired to adjust the length of the valve stem 16 for the purpose of compensating for wear or adjustment for improving the operation of the engine, it is only necessary to disengage nut 29 and sleeve 19 by screwing one away from the other along the threaded portion 18 of valve stem 16, the nut 29 being hexagonal as is conventional, and the sleeve 19 being provided with wrench flats 33, as illustrated in Fig. 3, which are accessible between the legs 23 of the cage 22. When the adjustment is made the nut 29 and the sleeve 19 are clamped together securely, each forming a lock for the other.

During operation of the engine the tappet 30 engages the base 24 of the cage 23, lifting the latter to disengage the abutment 21 from the flange 20 of sleeve 19 and move a distance longitudinally of the valve stem 16 which is equal to the space 28, whereupon the upper end of the sleeve 22 engages the nut 29 and opens the valve. In this way, the valve stem 16 is relieved of the pressure of spring 32 and the frictional drag between cage 22 and nut 29 and sleeve 19 is relatively low, so that the inherent twist of the spring is imparted only to the cage 22, which accordingly rotates relatively to the valve stem 16, the valve 15 not rotating.

During the valve-closing operation, the sleeve 22, being disengaged by the tappet 30, is forced downwardly by spring 32 so that its abutment 21 engages flange 20 of sleeve 19 with a firm frictional contact, whereby the return twist of the spring 32 is imparted by the cage 22 to the sleeve 19, and as the latter is securely locked to the valve stem 16, the stem and the valve 15 are rotated through a small angle. This rotation is repeated step-by-step during successive closings of the valve.

In order to take up play due to wear it is preferred that a light coil spring 34 be interposed between the lower surface of flange 20 and the upper surface of cage 22, as is illustrated in the drawing. This spring 34 does not retard the lifting action of tappet 30.

It will be seen that the present invention provides a very simple and effective means for effecting progressive, intermittent rotation of the valve without requiring special mechanism for doing so, the inherent twist of the spring being utilized for that purpose. Also, the length of the valve stem may be adjusted to suit requirements of operation and to compensate for wear of the tappet. The valve stem is not subject to wear because it is not directly engaged by the tappet, but on the contrary the wear is distributed over the relatively large area of the base 24 and thus is negligible.

While a preferred embodiment of the invention has been illustrated and described herein, it is to be understood that the invention is not limited thereby but is susceptible to changes in form and detail within its scope.

We claim:

1. In combination with a stemmed poppet valve having opening means and coil spring closing means, a shoulder on the stem, a cage normally urged into engagement with said shoulder by the spring means, said cage being reciprocable and freely rotatable in opposite directions relatively to said valve stem, a second shoulder for limiting the reciprocating movement of said cage along said stem, said cage being adjustable along said stem to vary the effective length of the valve stem and an extension on said cage for engagement by said opening means to disengage said cage from said first shoulder, said cage being alternately rotated in opposite directions by the inherent twist and untwist of said spring during valve opening and closing for imparting its rotation to said valve stem by frictional contact with one of said shoulders.

2. In combination with a stemmed poppet valve having opening means and coil spring closing means, a shoulder on the stem, a cage normally urged into engagement with said shoulder by the spring means, said cage being reciprocable and freely rotatable in opposite directions relatively to said valve stem, a second shoulder for limiting the reciprocatory movement of said cage along said stem, said shoulders being adjustable along said stem to vary the position of said cage thereon, and an extension on said cage for engagement by said opening means to disengage said cage from said first shoulder, said cage being alternately rotated in opposite directions by the inherent twist and untwist of said spring during valve opening and closing for imparting its rotation to said valve stem by frictional contact with one of said shoulders.

3. In combination with a stemmed poppet valve having opening means and coil spring closing means, a shoulder on the stem, a cage normally urged into engagement with said shoulder by the spring means, said cage being reciprocable and freely rotatable in opposite directions relatively to said valve stem, a second shoulder for limiting the reciprocatory movement of said cage along said stem, said shoulders being threaded on said stem for adjustment therealong to vary the position of said cage thereon, and an extension on said cage for engagement by said opening means to disengage said cage from said first shoulder, said cage being alternately rotated in opposite directions by the inherent twist and untwist of said spring during valve opening and closing for imparting its rotation to said valve stem by frictional contact with one of said shoulders.

4. In combination with a stemmed poppet valve having opening means and coil spring closing means, a sleeve threaded on the end of the valve stem and providing a shoulder, a stop nut threaded on the valve stem between said sleeve and the head of the valve and adapted to be positioned in spaced relation to said shoulder, a member freely rotatable in opposite directions and reciprocable between said shoulder and nut and adapted to be engaged by said valve opening means, and a flange on said member engaged by the coil spring.

5. In combination with a stemmed poppet valve having opening means and coil spring closing means, a sleeve threaded on the end of the valve stem and providing a shoulder, a stop nut threaded on the valve stem between said sleeve and the head of the valve, means spacing said shoulder and nut, a member freely rotatable in opposite directions and reciprocable between said shoulder and nut and adapted to be engaged by said valve opening means, and a flange on said member engaged by the coil spring.

6. In combination with a stemmed poppet valve having opening means and coil spring closing means, a sleeve threaded on the end of the valve stem and providing a shoulder, a stop nut threaded on the valve stem between said sleeve and the head of the valve, an extension on said sleeve spacing said shoulder and nut and locking said sleeve and nut together, a member freely rotatable in opposite directions and reciprocable between said shoulder and nut and adapted to be engaged by said valve opening means, and a flange on said member engaged by the coil spring.

7. In combination with a stemmed poppet valve having opening means and coil spring closing means, a sleeve threaded on the end of the valve stem and providing a shoulder, a stop nut threaded on the valve stem between said sleeve and the head of the valve, an extension on said sleeve positively spacing said shoulder and nut, a member freely rotatable in opposite directions and reciprocable between said shoulder and nut on said sleeve extension, an extension on said member extending beyond the end of said valve stem and adapted to be engaged by said valve opening means, and a flange on said member engaged by the coil spring.

8. In combination with a stemmed poppet valve having opening and closing means, a sleeve adjustably threaded along the stem of the valve near its end, a nut threaded on the stem between the sleeve and the head of the valve, a member between the sleeve and nut and freely rotatable in opposite directions, and an extension on said member for engagement by the valve spring and closing means, said member being adjustable longitudinally of said valve stem by said sleeve and nut to vary the effective length of the valve stem.

9. In combination with a stemmed poppet valve having opening and closing means, a sleeve adjustably threaded along the stem of the valve near its end, a nut threaded on the stem between the sleeve and the head of the valve, a member loosely mounted for reciprocation and free rotation in opposite directions between the sleeve and nut, and an extension on said member for engagement by the valve opening and closing means, said member being adjustable longitudinally of said valve stem by said sleeve and nut to vary the effective length of the valve stem.

10. In combination with a stemmed poppet valve having opening means and coil spring closing means, a shoulder on the stem, a cage normally urged into engagement with said shoulder by the spring means, said cage being reciprocable and freely rotatable in opposite directions relatively to said valve stem, a second shoulder for limiting the reciprocating movement of said cage along said stem, and an extension on said cage for engagement by said opening means to disengage said cage from said first shoulder, and engage it with said second shoulder, and a light spring interposed between said first shoulder and said cage extension, said cage being alternately rotated in opposite directions by the inherent twist and untwist of said spring during valve opening and closing for imparting its rotation to said valve stem by frictional contact with one of said shoulders.

11. In combination with a stemmed poppet valve having opening means and coil spring closing means, a sleeve on the stem having a shoulder thereon, a cage engaged by said spring means and normally urged thereby into engagement with the shoulder, said cage being reciprocable and freely rotatable in opposite directions relatively to the valve stem, a second shoulder on the stem for limiting the reciprocating movement of said cage along the stem, and an extension on said cage for engagement by the opening means to disengage said cage from said first shoulder and engage it with said second shoulder, said cage being alternately rotated in opposite directions by the inherent twist and untwist of said spring during valve opening and closing for imparting its rotation to said valve stem by frictional contact with one of said shoulders.

GEORGE WARREN DOUGLAS.
JOHN JOSEPH DEWEY.